(12) United States Patent
Andreas-Schott et al.

(10) Patent No.: US 7,935,449 B2
(45) Date of Patent: May 3, 2011

(54) PTC ELEMENT AS A SELF REGULATING START RESISTOR FOR A FUEL CELL STACK

(75) Inventors: Benno Andreas-Schott, Pittsford, NY (US); Glenn W. Skala, Churchville, NY (US); Jeffrey A. Rock, Fairport, NY (US); Balsu Lakshmanan, Pittsford, NY (US); Robert S. Foley, Rochester, NY (US); Michael W. Murphy, Manchester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 711 days.

(21) Appl. No.: 11/549,737

(22) Filed: Oct. 16, 2006

(65) Prior Publication Data
US 2008/0187802 A1 Aug. 7, 2008

(51) Int. Cl.
*H01M 8/04* (2006.01)
*H01M 8/24* (2006.01)
*H01M 2/34* (2006.01)

(52) U.S. Cl. ........ 429/433; 429/428; 429/430; 429/432; 429/452; 429/453

(58) Field of Classification Search .............. 429/34
See application file for complete search history.

(56) References Cited

U.S. PATENT DOCUMENTS

| | | | | |
|---|---|---|---|---|
| 5,601,742 | A * | 2/1997 | Yamashita | 219/207 |
| 5,897,766 | A * | 4/1999 | Kawatsu | 204/426 |
| 6,724,194 | B1 * | 4/2004 | Barton | 324/432 |
| 2003/0129461 | A1 * | 7/2003 | Bruck et al. | 429/13 |
| 2004/0234835 | A1 * | 11/2004 | Strobel et al. | 429/35 |
| 2005/0058865 | A1 * | 3/2005 | Thompson et al. | 429/26 |

FOREIGN PATENT DOCUMENTS

| | | |
|---|---|---|
| DE | 102004061784 A1 | 7/2006 |
| JP | 5-89900 | 4/1993 |
| JP | 2005 327587 A | 11/2005 |

OTHER PUBLICATIONS

Machine translation of JP 2005327587 A, Ogino et al., Nov. 2005.*

* cited by examiner

*Primary Examiner* — Basia Ridley
*Assistant Examiner* — Sean P Cullen
(74) *Attorney, Agent, or Firm* — Fraser Clemens Martin & Miller LLC; J. Douglas Miller

(57) ABSTRACT

At least one positive temperature coefficient element is used to efficiently control fuel cell voltage at startup and shutdown making the fuel cell more efficient and protecting the electro catalyst layer.

15 Claims, 3 Drawing Sheets

FIG - 5
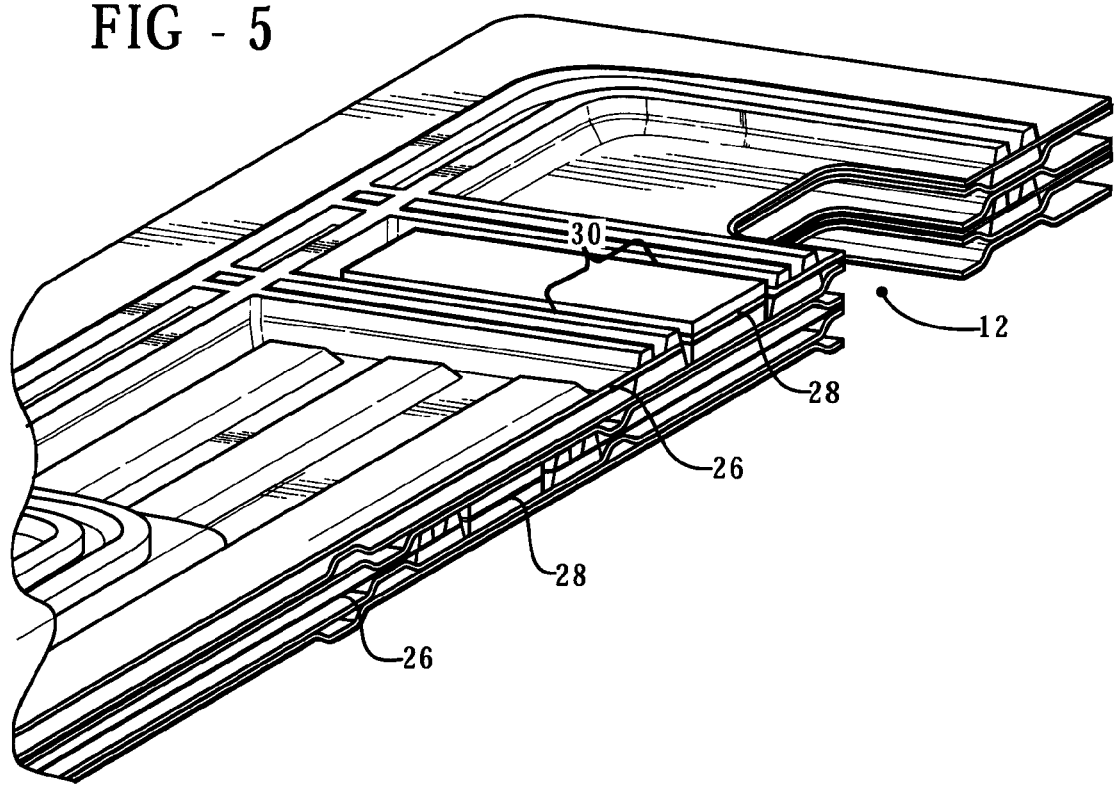
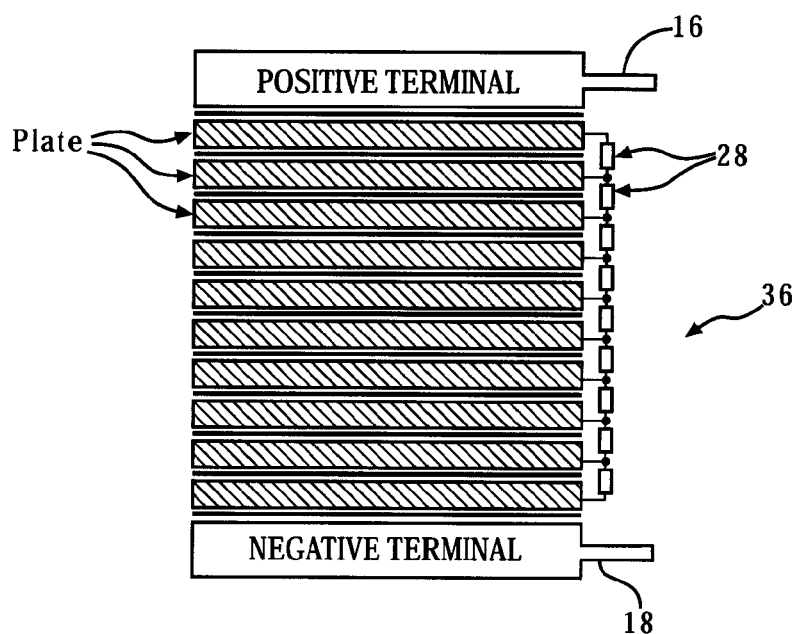
FIG - 6

PTC ELEMENT AS A SELF REGULATING START RESISTOR FOR A FUEL CELL STACK

FIELD OF THE INVENTION

This invention relates to the operation of fuel cells. More particularly, the invention is directed to an improved method of regulating the starting and stopping of a hydrogen fuel cell stack.

BACKGROUND OF THE INVENTION

With fuel cells being desired for automotive propulsion purposes, it has become important for fuel cells to achieve full power quickly. This requires a rapid increase from ambient temperature to normal operating temperature.

Electrochemical fuel cells convert fuel and oxidant into electricity, a reaction product (such as water in the case of a hydrogen fueled and oxygen oxidizing fuel cell), and heat. The fuel cell typically has a membrane electrode assembly ("MEA") separating the fuel from the oxidant. The MEA is where the reactions take place and contains the catalyst needed to accelerate the reaction.

The MEA can be damaged by the simultaneous presence of air and hydrogen in the anode. The amount of damage is determined by the cell voltage with higher voltages leading to greater damage. The time when this is most likely to occur is during fuel cell startup.

Because fuel cells typically produce low voltages, they are often organized into a stack of multiple cells connected in series. This allows them to combine to produce higher voltages.

One way to accelerate reaching an appropriate power level is to have the fuel cell stack short together its fuel cells. This holds down the voltage causing the fuel cells to produce extra heat that is supplemented by the resistive heating provided by the shorting element. The extra heat from both sources can speed the cell toward reaching normal operating temperatures where higher efficiencies can be achieved.

SUMMARY OF THE INVENTION

This invention solves the problem of how to inexpensively regulate a fuel cell to hold it to a low voltage level. The solution is to use a positive temperature coefficient (PTC) element as a shorting resistor. The PTC element has a low resistance at low operating temperatures, for example less than 40° Celsius, and a high resistance at normal operating temperatures such as 80° Celsius. With a resistance varying from four milliohms to four ohms a PTC could function as a thermally controlled switch.

Using the PTC can keep the voltage low during startup to limit the damage to the catalyst layer in the MEA caused by the presence of air and hydrogen in the anode at startup. This can help extend fuel cell life.

In one embodiment, the fuel cell assembly comprises at least a pair of spaced apart plates; a membrane positioned between the plates; and a positive temperature coefficient element electrically connected between the plates, whereby during startup of the fuel cell said element limits a voltage generated by the fuel cell until the fuel cell has reached a normal operating temperature.

In another embodiment, the fuel cell assembly comprises a plurality of bipolar plates arranged in a stack between a positive terminal and a negative terminal; a plurality of membranes, each membrane positioned between an associated pair of adjacent ones of the plates; and a positive temperature coefficient voltage limiting means electrically connected to the stack whereby during startup of the fuel cell the limiting means limits a voltage generated by the fuel cell until the fuel cell has reached a normal operating temperature.

In another embodiment, the fuel cell assembly comprises a plurality of bipolar plates arranged in a stack between a positive terminal and a negative terminal; a plurality of membranes, each membrane positioned between an associated pair of adjacent ones of the plates; and a plurality of positive temperature coefficient elements, each positioned in an opening formed in one of the membranes and electrically connected between the associated pair of plates, whereby during startup of the fuel cell the limiting means limits a voltage generated by the fuel cell until the fuel cell has reached a normal operating temperature.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a fragmentary perspective view of two fuel cells with PTC elements embedded to short together the cells;

FIG. 6 is a schematic diagram of a fuel cell stack incorporating the structure shown in FIG. 5.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
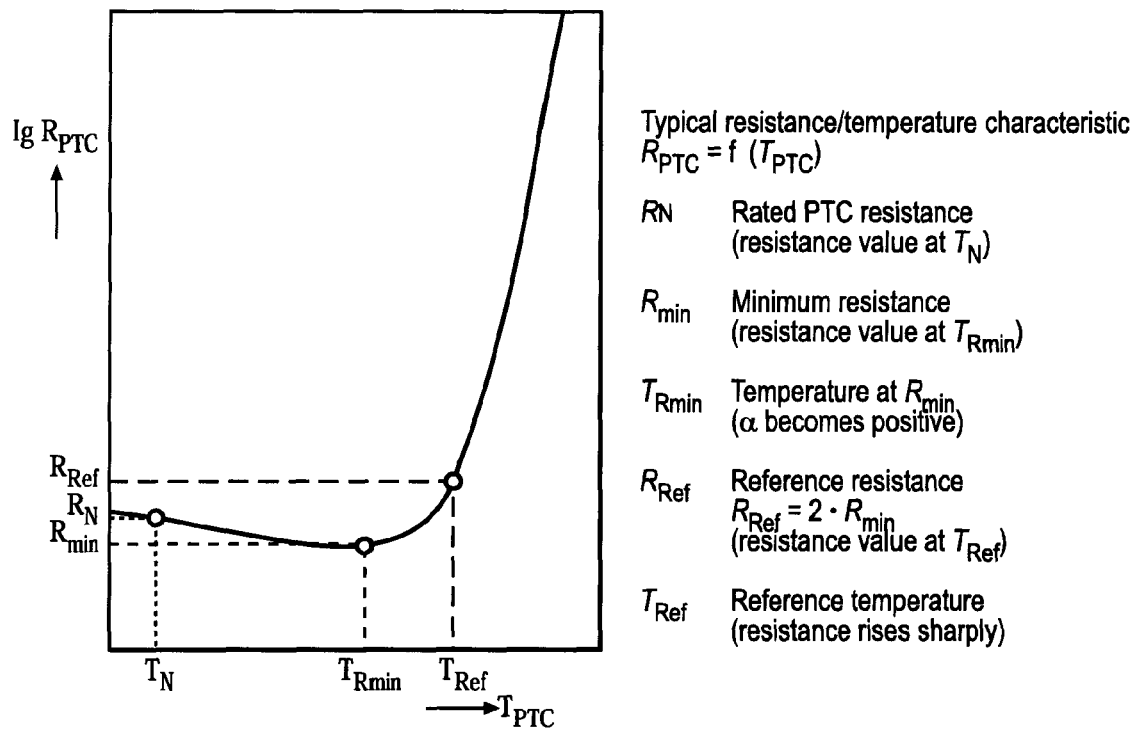
FIG. 1 is a graph of the typical resistance/temperature characteristic of a PTC element.

The invention utilizes a positive temperature coefficient (PTC) element as a shorting resistor for fuel cell stacks. An example of the resistance characteristics of a typical PTC element is shown in FIG. 1 where it can be seen that a defining characteristic is that the resistance increases sharply with temperature after a minimum temperature. The use of a PTC element is an inexpensive way to control the fuel cell stack voltage at startup to cause it to generate more heat and thereby quickly reach more efficient operating temperatures. The PTC element works by holding down the voltage of the fuel cells which causes the fuel cells to more efficiently produce heat and to less efficiently produce electricity. In addition the resistive heat provided by the PTC element can help to speed the stack to normal operating temperatures.

At startup of the fuel cell the PTC element is at a temperature $T_N$, probably colder than 40° C. At this temperature the PTC element has a low resistance $R_N$ that will bring the voltage down and prevents degradation of the membrane. The PTC element will heat up over time and change its resistance. At a temperature above $T_{Ref}$ the resistance increases exponentially and self limits itself. Between 40° C. and 80° C. the resistivity of the material can increase by approximately three orders of magnitude resulting in a thermally controlled "switch".

Typical PTC elements are about 1300 microns thick. This results in resistances ($R_{Ref}$) on the order of five ohms for elements that are 130 mm² in area. This invention requires "on" resistances on the order of milliohms. This can be done by reducing thickness and/or increasing the contact area of the element. In the fuel cell application it is preferred to keep the contact area on the order of 100 square mm or less. This requires the PTC material to be on the order of 20 to 40 microns thick.

Figure 2:
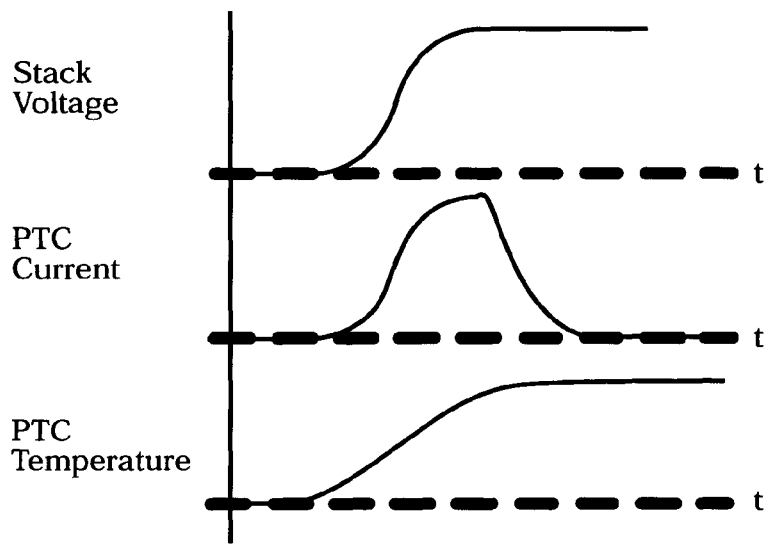
FIG. 2 is a graph of fuel cell stack voltage, PTC element current and PTC element temperature versus time for a typical startup.

This invention uses the PTC element as a shorting resistor in the fuel cell stack to dissipate the stack's energy after key-off and as a startup resistor to provide resistive heating to help warm the stack. The PTC element is always electrically connected (either across the entire fuel cell stack or between each cell of the stack). Whether the PTC element is at a four milliohm resistance (closed) or a four ohm resistance (open) can be controlled by stack coolant temperature, preferably the coolant inlet temperature. At shutdown the reactant flow to the stack is stopped but there are residual reactants inside the stack that keep voltage levels high. A continued flow of cold coolant (<40° C.) into the stack for a short period of time would cause the PTC element to cool and become "shorted", depleting the reactants and discharging the stack. FIG. 2 shows stack voltage, PTC current and PTC temperature waveforms for a typical startup.

Figure 3:
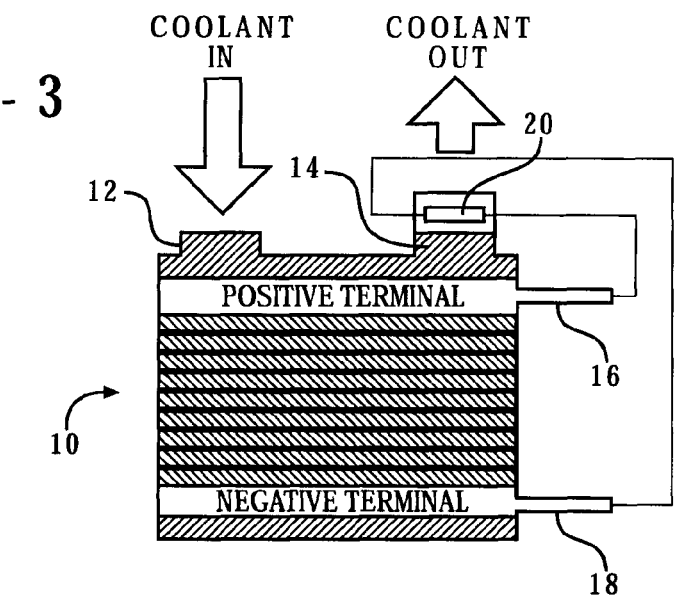
FIG. 3 is a schematic diagram of a fuel cell stack with a single PTC element.

In a first embodiment of the present invention, only one PTC element with a heat sink or coupled to the stack (e.g. coolant outlet) will be connected to a stack. In FIG. 3, a fuel cell stack has a coolant inlet 12 and a coolant outlet 14. Electrical power is generated to a load (not shown) connected between a positive terminal 16 and a negative terminal 18. A PTC element 20 is positioned at the coolant outlet 14 and is connected between the terminals 16 and 18. This element 20 would need to be designed for high voltage (up to 450 VDC) requiring a thicker PTC element to avoid shorting at the high voltage and a large contact area to get the "on" resistance down to levels where it will discharge the stack 10 in a reasonable time. The PTC element 20 is connected electrically across the entire stack and coupled thermally to the coolant outlet 14. The amount of time that the PTC element will remain in the low resistance mode is determined by the combination of its power dissipation and the heat transfer to the coolant. This embodiment has the advantage of a simple electrical connection and only one PTC element. However, during charge and discharge cycles if any single cell is reactant starved, this embodiment could lead to corrosion.

Figure 4:
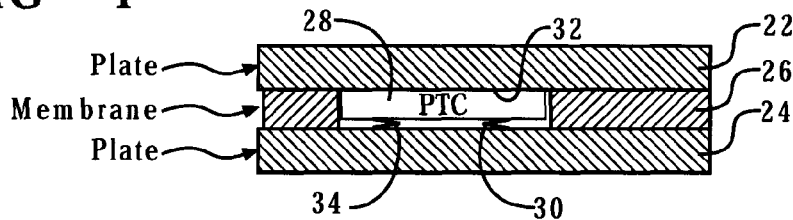
FIG. 4 is a schematic diagram of a fuel cell with a PTC element embedded in the membrane.

Thin PTC elements could be integrated in every bipolar plate or membrane in a second embodiment of the present invention. As shown in FIG. 4, plates 22 and 24 are positioned on opposite sides of a membrane 26. A PTC element 28 is positioned in a cavity 30 formed in the membrane 26. Screen printed PTC ink could be an option as well as long as it exhibits the same temperature/resistivity characteristics as shown above in FIG. 1. In a stamped design, the preferred location for the one per cell PTC element is near the coolant inlet header. This region has no reactant or coolant contact, yet is well coupled thermally to the coolant. The seal load from the neighboring cells will provide a contact force that is relatively insensitive to tolerances.

In FIG. 4, the PTC element 28 is bonded at 32 to the upper plate 22. A leaf spring 34 is positioned between the PTC element 28 and the lower plate 24 to enhance electrical contact.

FIG. 5 shows the embedded PTC element embodiment in more detail. The locations of the PTC elements 28 can be staggered on adjacent cells to make better use of the cell repeating distance. The opening 30 in the membrane 26 (or sub-gasket or carrier) for each cell is required to allow the plate to be shorted via the PTC element 28. A stack 36 configured in this manner will essentially have a PTC element across every cell as shown in the electrical equivalent circuit of FIG. 6. This configuration retains simple electrical connections, but provides a unique current path for each cell eliminating reactant distribution and corrosion concerns.

During startup after a shutdown both the anode and cathode side of the fuel cell stack would be filled with air. Hydrogen is fed to the anode side first which leads to a $H_2$-air front on the anode side with air on the cathode side. The cell voltage during this initial phase determines the rate of electrode damage; a higher voltage leads to higher degradation rate of the electro catalyst layer. It is preferable to use a resistive element to draw down the voltage during startup wherein a smaller resistor leads to lower voltage and hence lower degradation rates. However, a smaller resistor is tough to implement for a stack due to the packaging constraint on the reliability of the contactors. A silicon controlled rectifier (SCR) can be used as the resistive element in the fuel cell stacks$_{[RF1]}$.

Figure 7:
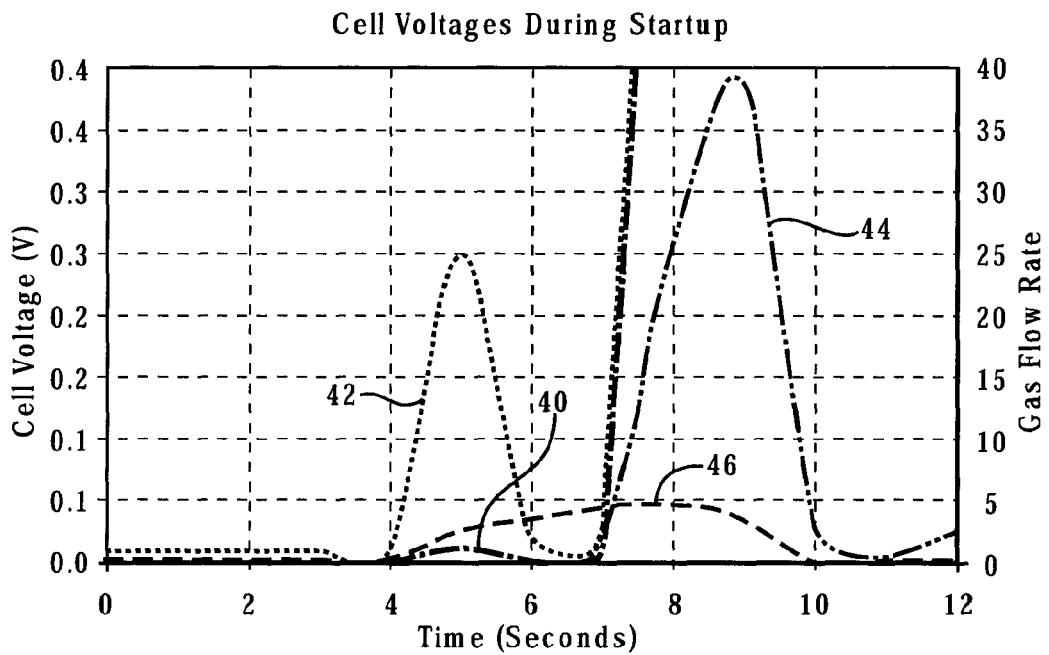
FIG. 7 is a graph of cell voltage, stack air flow and stack hydrogen flow during startup comparing a low resistance case with a higher resistance case.

FIG. 7 shows a plot of the cell voltage and the air and hydrogen gas flow rates during a startup sequence. The cell voltage under case 1 (40) and case 2 (42) are shown as an illustration for two different resistance values, $R_{case1} \ll R_{case2}$ to highlight the need for smaller resistance. SCR elements by design have a very small resistance at start and hence can be used as start-stop resistors$_{[RF2]}$. The flow rate for the air is shown by line 44 and the flow rate for the hydrogen is shown by the line 46.

The apparatus according to the present invention eliminates expensive star/stop relays and external control, and is easier to package than relays. For a brief time during cold starts each of the cells would produce very little voltage (and a lot of heat) due to the cells being shorted together. The additional heat is very helpful in warming the stack to operating temperature.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A fuel cell comprising:
   at least a pair of spaced apart plates;
   a membrane positioned between said plates;
   a positive temperature coefficient element electrically connected between said plates, wherein said positive temperature coefficient element is positioned in an opening formed in said membrane and directly abuts one of said plates, and wherein said positive temperature coefficient element provides a shorting conduit between said plates to limit a voltage generated by the fuel cell until the fuel cell has reached a normal operating temperature; and
   a spring positioned in said opening between said positive temperature coefficient element and one of said plates, wherein said spring is an electrical conductor in electrical communication with the positive temperature coefficient element and the one of said plates to provide an electrical conduit therebetween.

2. The fuel cell according to claim 1 wherein said positive temperature coefficient element is bonded to one of said plates.

3. The fuel cell according to claim 1 wherein said positive temperature coefficient element has a contact area with said plates of less than 100 square millimeters.

4. The fuel cell according to claim 1 wherein said positive temperature coefficient element is formed of screen printed ink.

5. The fuel cell according to claim 1 wherein the fuel cell includes a plurality of said membrane, a plurality of said positive temperature coefficient element, and a plurality of said plates arranged in a stack, one of said membranes positioned between each adjacent pair of said plates and one of said positive temperature coefficient elements connected between said plates of each adjacent pair of plates.

6. The fuel cell according to claim 5 wherein said positive temperature coefficient elements are staggered on adjacent ones of said membranes.

7. The fuel cell according to claim 1 wherein said positive temperature coefficient element is in a range of 20 to 40 microns thick.

8. The fuel cell according to claim 1 wherein said positive temperature coefficient element is a silicon controlled rectifier.

9. A fuel cell comprising:
a plurality of bipolar plates arranged in a stack between a positive terminal and a negative terminal;
a plurality of membranes, each of said membranes positioned between an associated pair of adjacent ones of said bipolar plates;
a positive temperature coefficient voltage limiting means electrically connected to said stack, wherein said positive temperature coefficient voltage limiting means includes a plurality of positive temperature coefficient elements each positioned in an opening formed in one of said membranes, directly abutting one of said bipolar plates, and electrically connected between said associated pair of bipolar plates, and wherein said positive temperature coefficient voltage limiting means has a minimum resistance of approximately four milliohms to provide a shorting conduit between said bipolar plates and limit a voltage generated by the fuel cell until the fuel cell has reached a normal operating temperature; and
a spring positioned in said opening between one of said positive temperature coefficient elements and one of said bipolar plates, wherein said spring is an electrical conductor in electrical communication with the one of said positive temperature coefficient elements and the one of said bipolar plates to provide an electrical conduit therebetween.

10. The fuel cell according to claim 9 wherein each said positive temperature coefficient element is bonded to one of said associated bipolar plates.

11. The fuel cell according to claim 9 wherein said positive temperature coefficient elements are staggered on adjacent ones of said membranes.

12. A fuel cell comprising:
a plurality of bipolar plates arranged in a stack between a positive terminal and a negative terminal;
a plurality of membranes, each of said membranes positioned between an associated pair of adjacent ones of said bipolar plates;
a plurality of positive temperature coefficient elements, each of said positive temperature coefficient elements positioned in an opening formed in one of said membranes, directly abutting one of said bipolar plates, and electrically connected between said associated pair of plates, whereby said positive temperature coefficient elements provide a shorting conduit between said bipolar plates to limit a voltage generated by the fuel cell until the fuel cell has reached a normal operating temperature; and
a spring positioned in said opening between one of said positive temperature coefficient elements and one of said bipolar plates, wherein said spring is an electrical conductor in electrical communication with the one of said positive temperature coefficient elements and the one of said bipolar plates to provide an electrical conduit therebetween.

13. The fuel cell according to claim 12 wherein each said positive temperature coefficient element is bonded to one of said associated bipolar plates.

14. The fuel cell according to claim 12 wherein said positive temperature coefficient elements are staggered on adjacent ones of said membranes.

15. The fuel cell according to claim 12 wherein said positive temperature coefficient elements are in a range of 20 to 40 microns thick.

* * * * *